(12) United States Patent
Tiramani et al.

(10) Patent No.: US 6,802,409 B1
(45) Date of Patent: Oct. 12, 2004

(54) WHEELED LUGGAGE AND ASSOCIATED DEVICES

(75) Inventors: Paolo M. B. Tiramani, Greenwich, CT (US); John A. Bozak, Greenwich, CT (US)

(73) Assignee: 500 Group, Inc., Stamford, CT (US)

( * ) Notice: Subject to any disclaimer, the term of this patent is extended or adjusted under 35 U.S.C. 154(b) by 0 days.

(21) Appl. No.: 09/623,341

(22) PCT Filed: Feb. 17, 1999

(86) PCT No.: PCT/US99/03368

§ 371 (c)(1),
(2), (4) Date: Dec. 4, 2000

(87) PCT Pub. No.: WO99/44461

PCT Pub. Date: Sep. 10, 1999

Related U.S. Application Data

(60) Provisional application No. 60/076,705, filed on Apr. 3, 1998.

(51) Int. Cl.⁷ .............................. A45C 5/00; A45C 13/00
(52) U.S. Cl. .............. 190/18 A; 190/115; 280/473.371; 280/37; 16/113.1
(58) Field of Search ............................. 190/18 A, 115; 280/37, 47.17, 47.26, 47.371, 79.2; 16/113.1

(56) References Cited

U.S. PATENT DOCUMENTS

| | | |
|---|---|---|
| 2,581,417 A | 1/1952 | Jones |
| 3,113,650 A | 12/1963 | Szabo |
| 3,960,252 A | 6/1976 | Cassimally |
| 4,087,102 A | 5/1978 | Sprague |
| 4,254,850 A | 3/1981 | Knowles |
| 4,273,222 A | 6/1981 | Cassimally et al. |
| 4,284,286 A * | 8/1981 | Lewallen ................. 280/47.18 |
| 4,411,343 A | 10/1983 | Cassimally et al. |
| 4,575,109 A | 3/1986 | Cowdery |
| 4,588,055 A | 5/1986 | Chen |
| 4,618,035 A | 10/1986 | Mao |
| 4,733,549 A | 3/1988 | Baker |
| 4,979,598 A | 12/1990 | Verheij et al. |
| 4,995,487 A | 2/1991 | Plath |
| 5,096,265 A | 3/1992 | Chang |
| 5,114,164 A | 5/1992 | Bothwell et al. |
| 5,167,306 A | 12/1992 | Carrigan, Jr. |
| 5,207,439 A * | 5/1993 | Mortenson ................. 280/47.2 |
| 5,230,408 A * | 7/1993 | Sadow ..................... 190/18 A |
| 5,240,106 A | 8/1993 | Plath |
| 5,295,565 A | 3/1994 | Latshaw |
| 5,407,039 A | 4/1995 | Alper et al. |
| 5,431,263 A | 7/1995 | Nordstrom |
| 5,464,080 A | 11/1995 | Liang |
| 5,464,081 A | 11/1995 | Zwanzig |
| 5,474,162 A | 12/1995 | Shyr et al. |
| 5,482,147 A | 1/1996 | Wang |
| 5,500,981 A | 3/1996 | Ho |
| 5,519,919 A | 5/1996 | Lee |
| 5,522,487 A | 6/1996 | Nordstrom |
| 5,524,737 A | 6/1996 | Wang |
| 5,568,848 A | 10/1996 | Liang |
| 5,779,251 A | 7/1998 | Meier |
| 5,813,503 A | 9/1998 | Chang |
| 5,873,439 A * | 2/1999 | Liang ...................... 190/18 A |
| 5,984,326 A * | 11/1999 | Abraham et al. .......... 280/47.2 |
| 6,082,510 A * | 7/2000 | Liang ...................... 190/18 A |
| 6,182,981 B1 * | 2/2001 | Kuo ........................... 280/37 |
| 6,193,033 B1 * | 2/2001 | Sadow et al. ............. 190/18 A |

FOREIGN PATENT DOCUMENTS

| | | |
|---|---|---|
| FR | 2 641 172 | 7/1990 |
| GB | 2 168 035 | 6/1986 |
| GB | 2 245 543 | 1/1992 |
| WO | WO 93/19636 | 10/1993 |
| WO | WO 97/48304 | 12/1997 |

* cited by examiner

Primary Examiner—Tri M. Mai
(74) Attorney, Agent, or Firm—Ansel M. Schwartz

(57) ABSTRACT

A luggage article including first rollers (44, 46) and selectively deployable or non deployable second rollers (52, 54). The luggage article includes a handle (26) that is movable between a retracted position and an extended position. The user can selectively deploy or not deploy the second rollers even when the handle is in the extended position. An improved detent device and also an improved caster system (200) are also disclosed. Also, a wheeled panel mechanism by itself for use not only with luggage but also other articles such as carts, dollies and baby carriages, is disclosed.

23 Claims, 19 Drawing Sheets

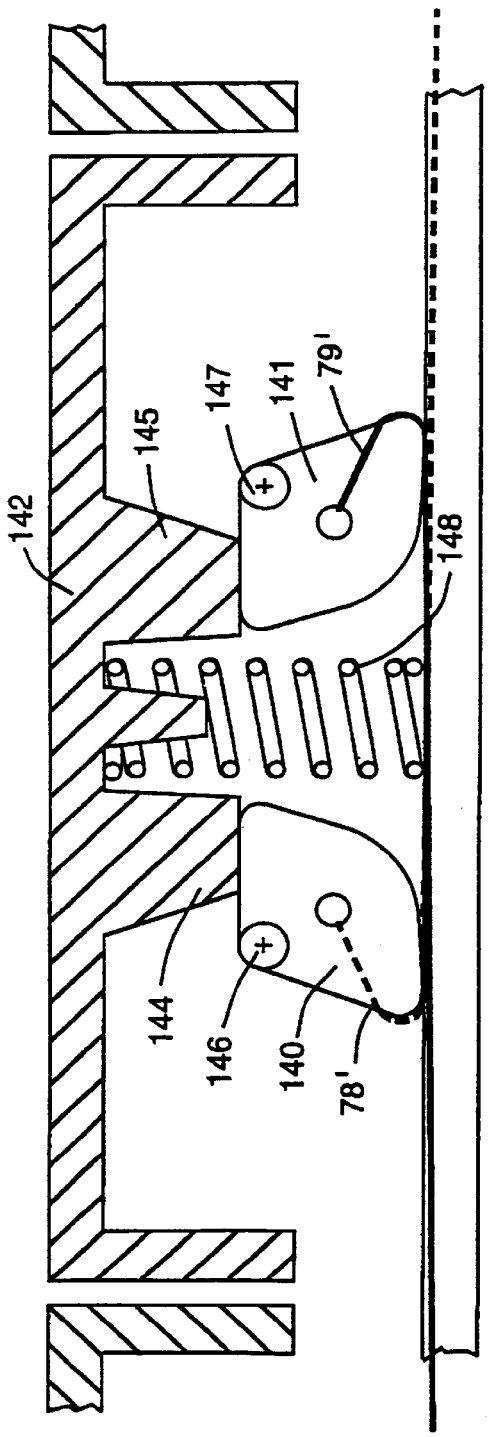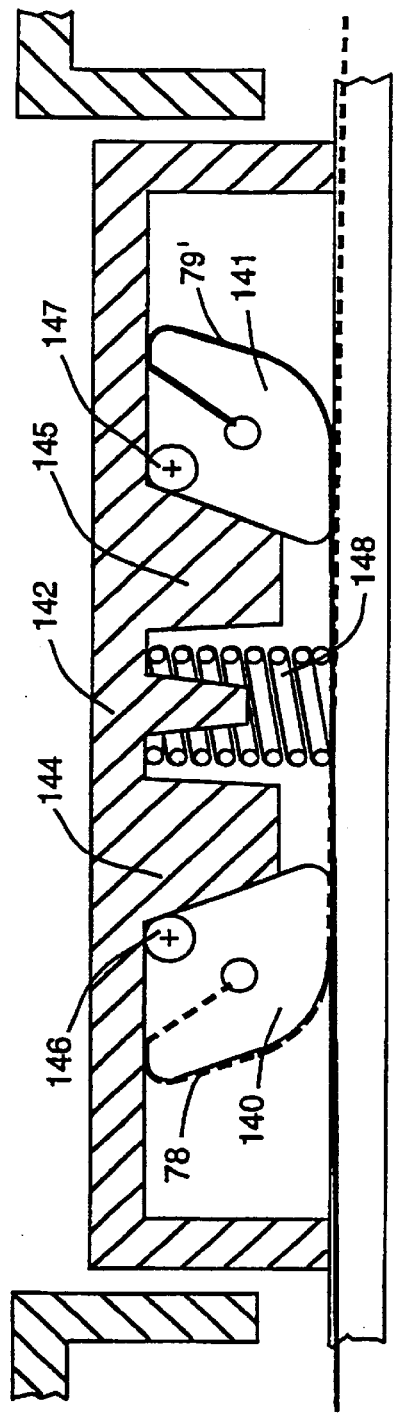
FIG. 8A
FIG. 8B

WHEELED LUGGAGE AND ASSOCIATED DEVICES

The present invention claims priority from provisional application No. 60/076,705 filed on Apr. 3, 1998.

BACKGROUND OF THE INVENTION

The inventions disclosed herein concern improvements in wheeled luggage and associated devices. Conventionally, wheeled luggage includes one or more wheels integral with the frame of the luggage. A retractable or foldable handle is provided to allow the luggage to be pushed or pulled along the ground. This alleviates the need for the user to carry and thus support the entire weight of the luggage.

In order to provide further stability and support to the luggage, a retractable panel has been provided which includes an extra wheel or two. The retractable panel is automatically deployed by pulling up on the handle. The extra wheels can be casters in order to increase the maneuverability of the luggage. Examples of such items are disclosed in U.S. Pat. Nos. 5,519,919 and 5,568,848.

One major disadvantage of the devices disclosed in the above two mentioned patents is that the retractable panel including the extra wheel or wheels is automatically deployed upon pulling up of the handle. Thus, even when the extra stability and support of the extra wheel(s) is not needed, the retractable panel is deployed. There is no way to use the luggage with the handle in an extended state while at the same time not deploying the retractable panel.

What is needed, therefore, are improvements in wheeled luggage which overcome the above noted disadvantages of the prior art as well as other improvements in the detent systems for the handle, the caster disposed on the retractable panel and pushbutton mechanisms.

SUMMARY OF THE INVENTION

The luggage article of the invention satisfies the above-mentioned needs as well as others. The luggage article includes a storage compartment and first rolling means projecting from the storage compartment. A wheeled panel mechanism is provided which includes a pivotably mounted panel, the panel having second rolling means. Operatively associated with the wheeled panel mechanism is a handle which is movable between a retracted position and an extended position. The luggage article finally includes means for selective deployment or nondeployment of the second rolling means when the handle is moved from the retracted position to the extended position. In this way, the user has a choice to use or not use the second rolling means even when the handle is in an extended position.

An improved detent means and improved caster system for the second rolling means are also disclosed. A wheeled panel mechanism itself for use not only with luggage but also other articles, such as carts, dollies and baby carriages is also provided. An improved pushbutton device is also disclosed.

BRIEF DESCRIPTION OF THE DRAWING

A full understanding of the invention can be gained from the following detailed description of the invention when read in conjunction with the accompanying drawings in which:

FIGS. 8A and 8B are cross-sectional views of another embodiment of the pushbutton.

DETAILED DESCRIPTION

Figure 1:
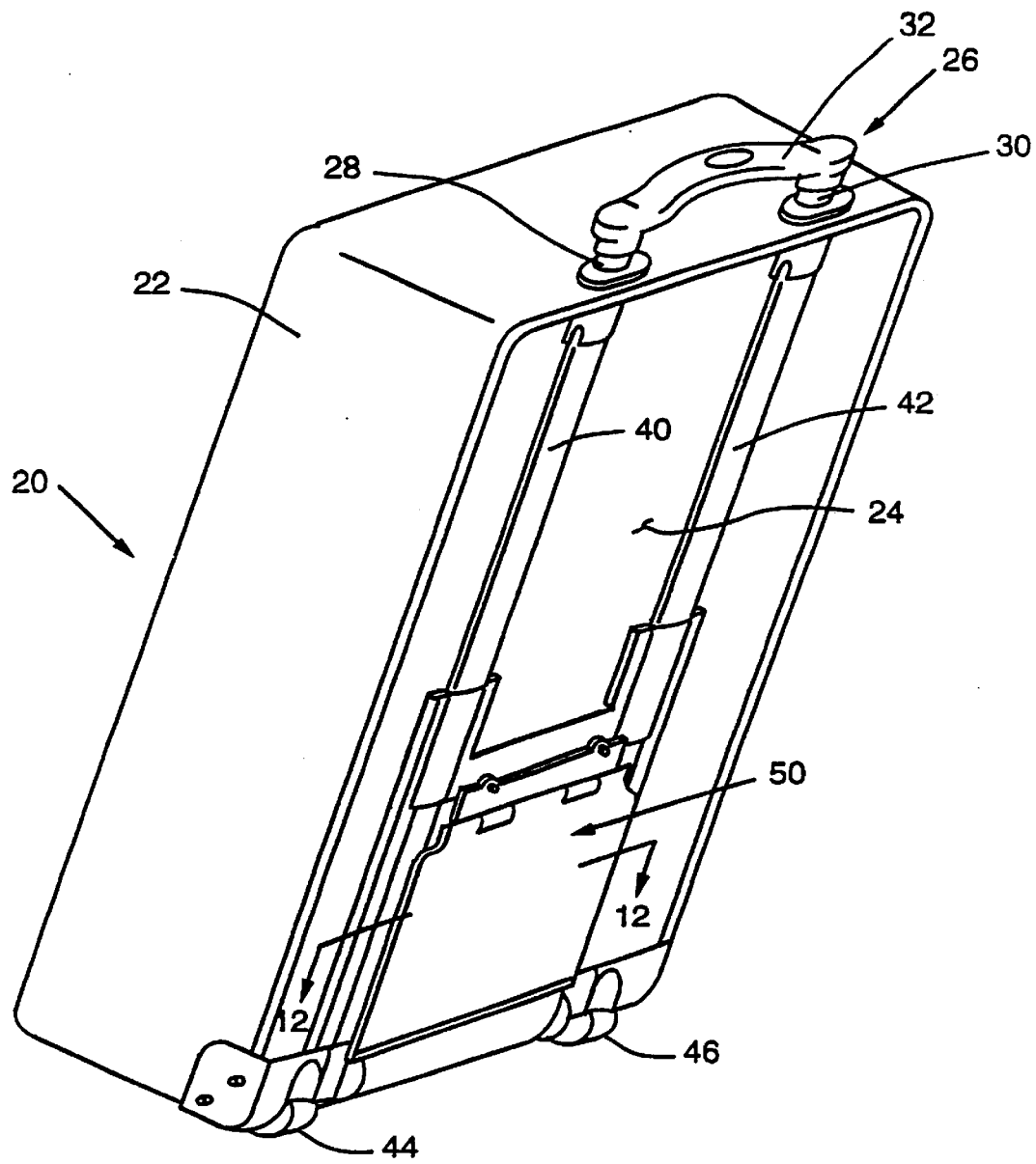
FIG. 1 is a perspective view of a luggage article, partially cutaway, showing the wheeled panel mechanism of the invention with the handle in a retracted position and the wheeled panel mechanism in a nondeployed position.
Figure 2:
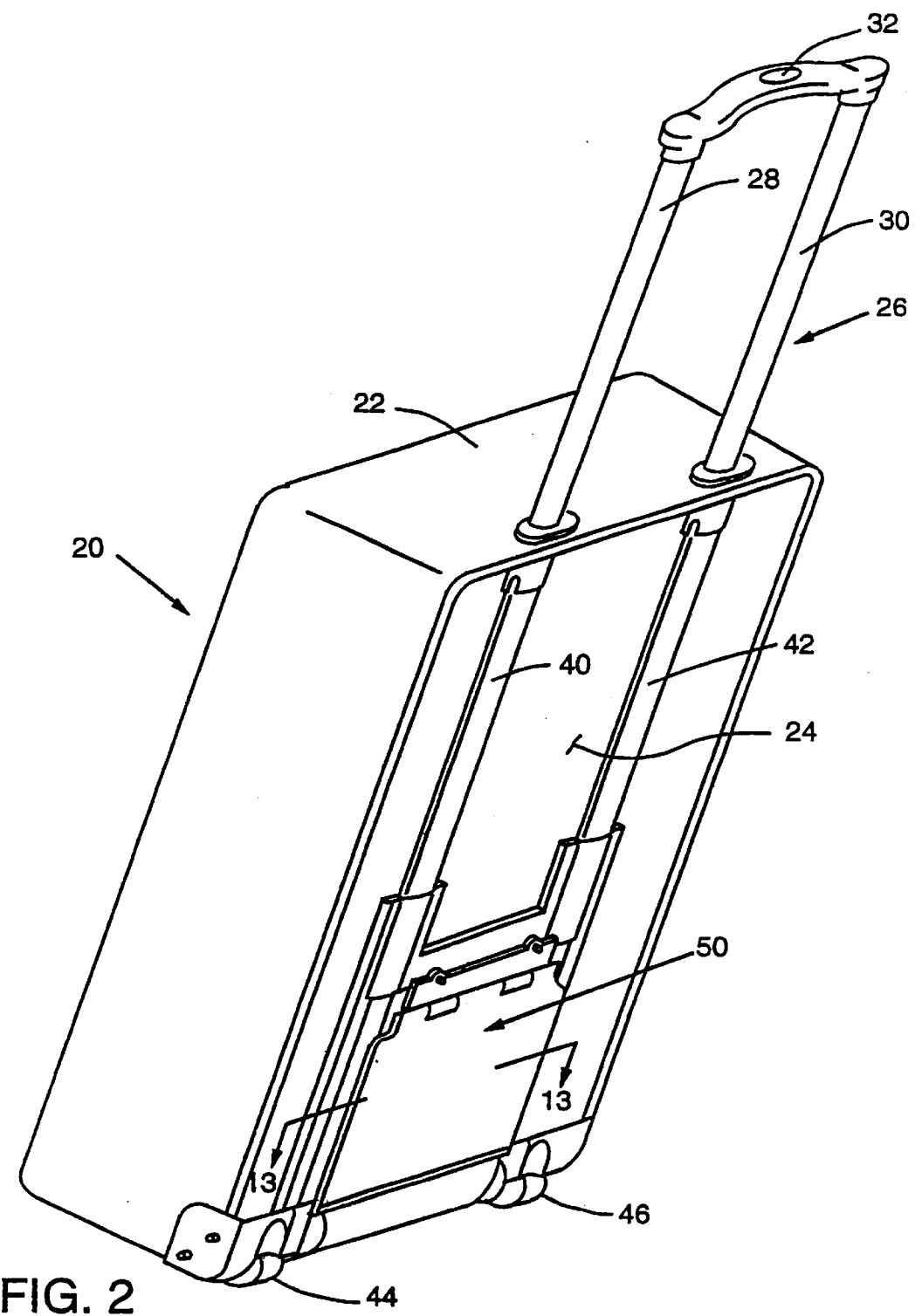
FIG. 2 is a perspective view of a luggage article, partially cutaway, showing the handle in an extended position and the wheeled panel mechanism in a nondeployed position.
Figure 3:
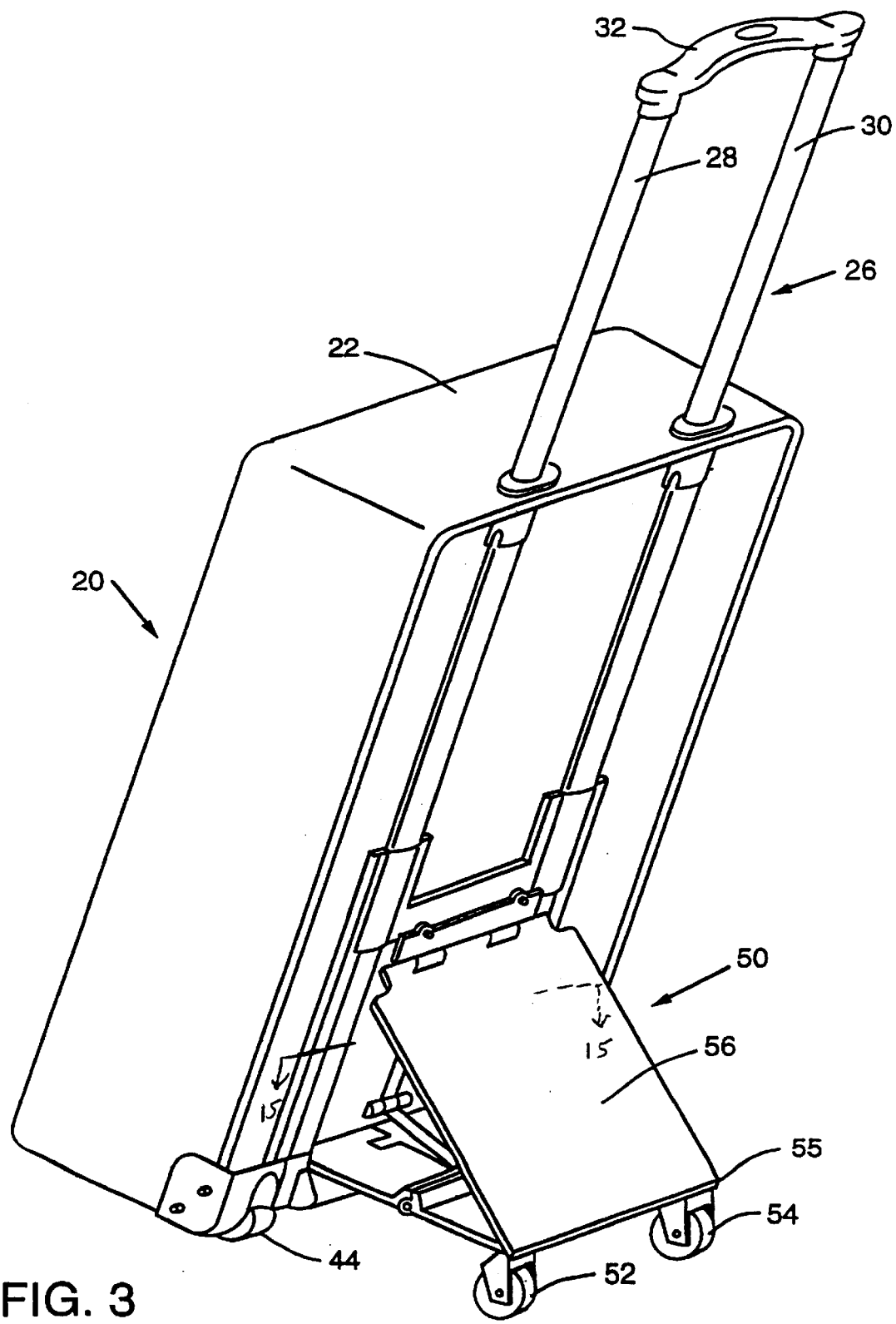
FIG. 3 is a perspective view of a luggage article, partially cutaway, showing the handle in an extended position and the wheeled panel mechanism in a deployed position.

Referring more particular to FIGS. 1–3, the basic concept of one of the inventions disclosed herein will be discussed. A luggage article 20 is shown. The luggage article 20 includes, in this embodiment, a unitary frame or gusset 22 made of plastic. A fabric covering (not shown) can be used to create the storage compartment 24 for the luggage article 20. It will be appreciated that the invention herein can also be used with so-called "hard-sided" luggage, in addition to the soft-sided (or gussetted) luggage shown. Broadly, the luggage article 20 includes handle means 26 which includes a pair of spaced apart male tubing members 28 and 30 which are joined together at the top by a gripping portion 32. The male tubing members 28 and 30 engage into female tubes 40 and 42. It will be appreciated that the male tubing members 28 and 30 and the gripping portion 32 can be moved from a retracted position, as shown in FIG. 1 to an extended portion as shown in FIGS. 2 and 3.

FIG. 2 shows the luggage article 20 with the handle means 26 in an extended position. In this position, the luggage article 20 can be rolled along a surface by means of first rolling means shown here as a pair of spaced apart wheels 44 and 46. The design and positioning of these wheels are well known to those skilled in the art.

Referring to FIG. 3, the luggage article 20 is also shown with the handle means 26 extended. A wheeled panel mechanism 50, which will be discussed in much greater detail below, is provided which includes second rolling means, in this case unique and novel casters 52 and 54, mounted by means of a caster support bar 55 to a pivotably mounted panel 56 of the wheeled panel mechanism 50 (see FIG. 3). The wheeled panel mechanism 50 provides greater support for the luggage article 20 and allows the luggage article 20 to be more easily pushed by the user.

In accordance with the invention, the luggage article 20 includes means for selective deployment or nondeployment of the second rolling means 52, 54 of the luggage article when the handle means 26 is moved from the retracted position (FIG. 1) to the extended position (FIGS. 2 and 3). The advantage of the luggage article 20 of the invention is that, in contrast to prior art luggage articles, the user has a choice of whether or not to deploy the wheeled panel mechanism 50 when the handle means 26 is extended. Thus, for example, when the user only needs to use the first rolling means 44, 46, such as when the load is light or when it is desired to move the luggage article 20 in close quarters, the wheeled panel mechanism 50 does not have to be deployed when the handle means 26 is extended. Conversely, when the wheeled panel mechanism 50 is really needed, such as when the load is heavy or when it is desired to stack other items on the luggage article 20, the wheeled panel mechanism 50 can be deployed to create a luggage cart.

Referring now more particularly to FIGS. 4–15, one embodiment of the invention for accomplishing the broad concept of the invention will be discussed. It will be appreciated, however, that the invention can encompass other means, not shown, for allowing the selective deployment or nondeployment of the second rolling means (casters 52 and 54) which are mounted to the pivotably mounted panel 56.

Figure 4:
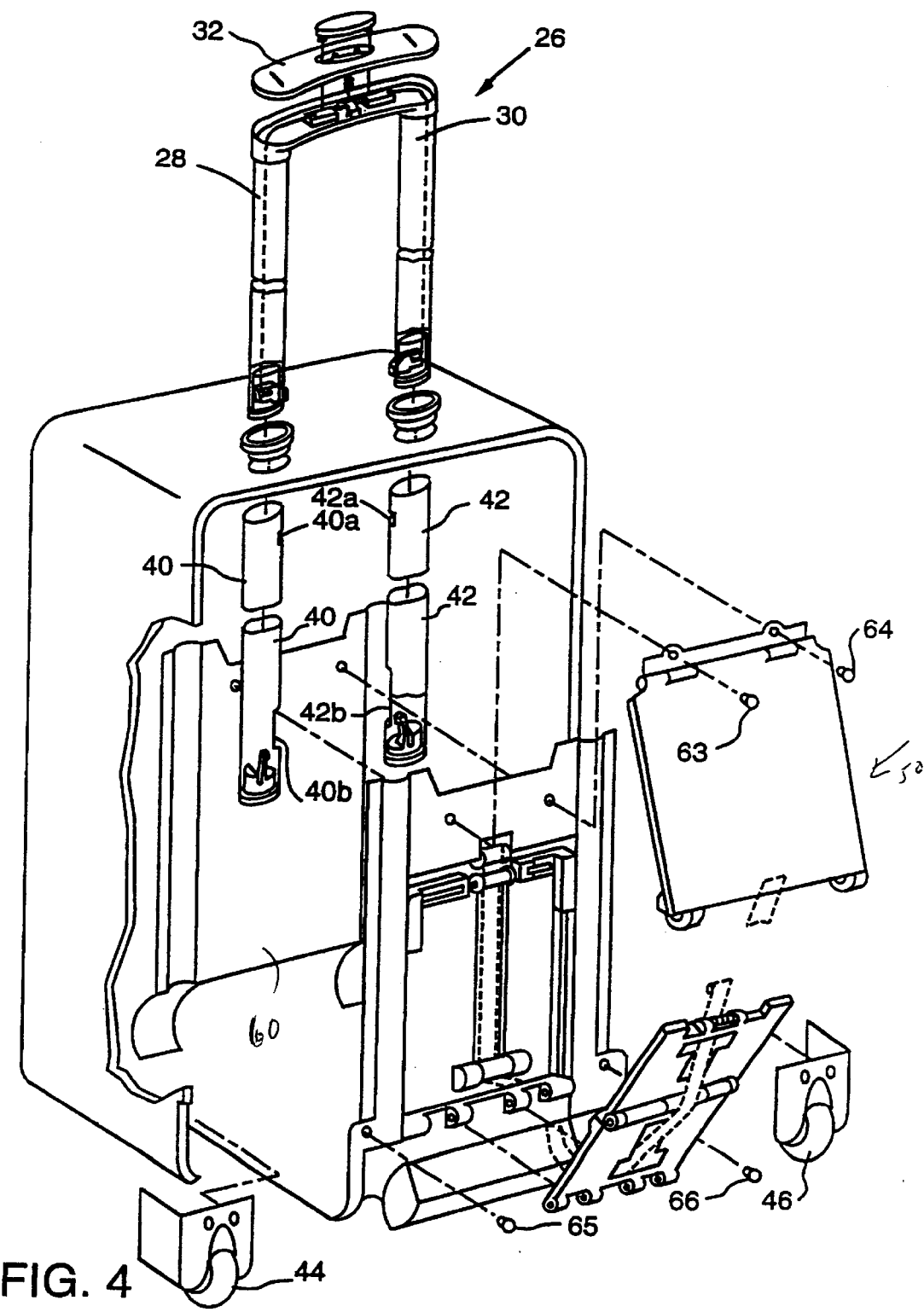
FIG. 4 is a partially exploded perspective view showing the wheeled panel mechanism.

Referring now specifically to FIG. 4, with reference generally to FIGS. 1–3, the wheeled panel mechanism 50 is preferably a modular component which can be attached separately to an existing luggage article. A framing member 60 is attached to the female tubing members 40 and 42. The wheeled panel mechanism 50 is then attached to the framing member 60 and secured thereto by fastening means, such as rivets 63, 64, 65 and 66. The construction and operation of the wheeled panel mechanism 50 will be discussed in detail below.

Figure 5:
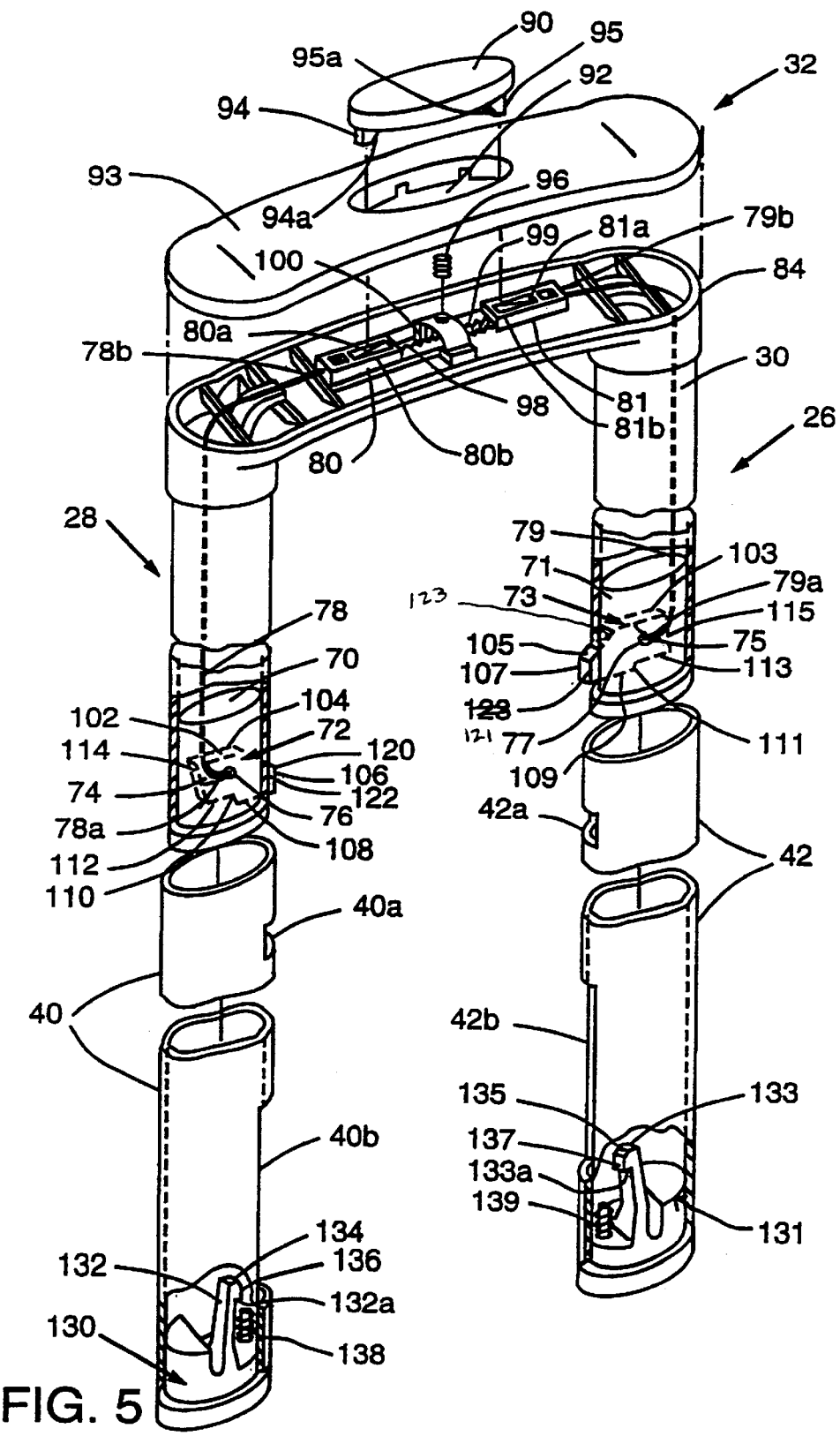
FIG. 5 is an exploded perspective view of the handle means.
Figure 6:
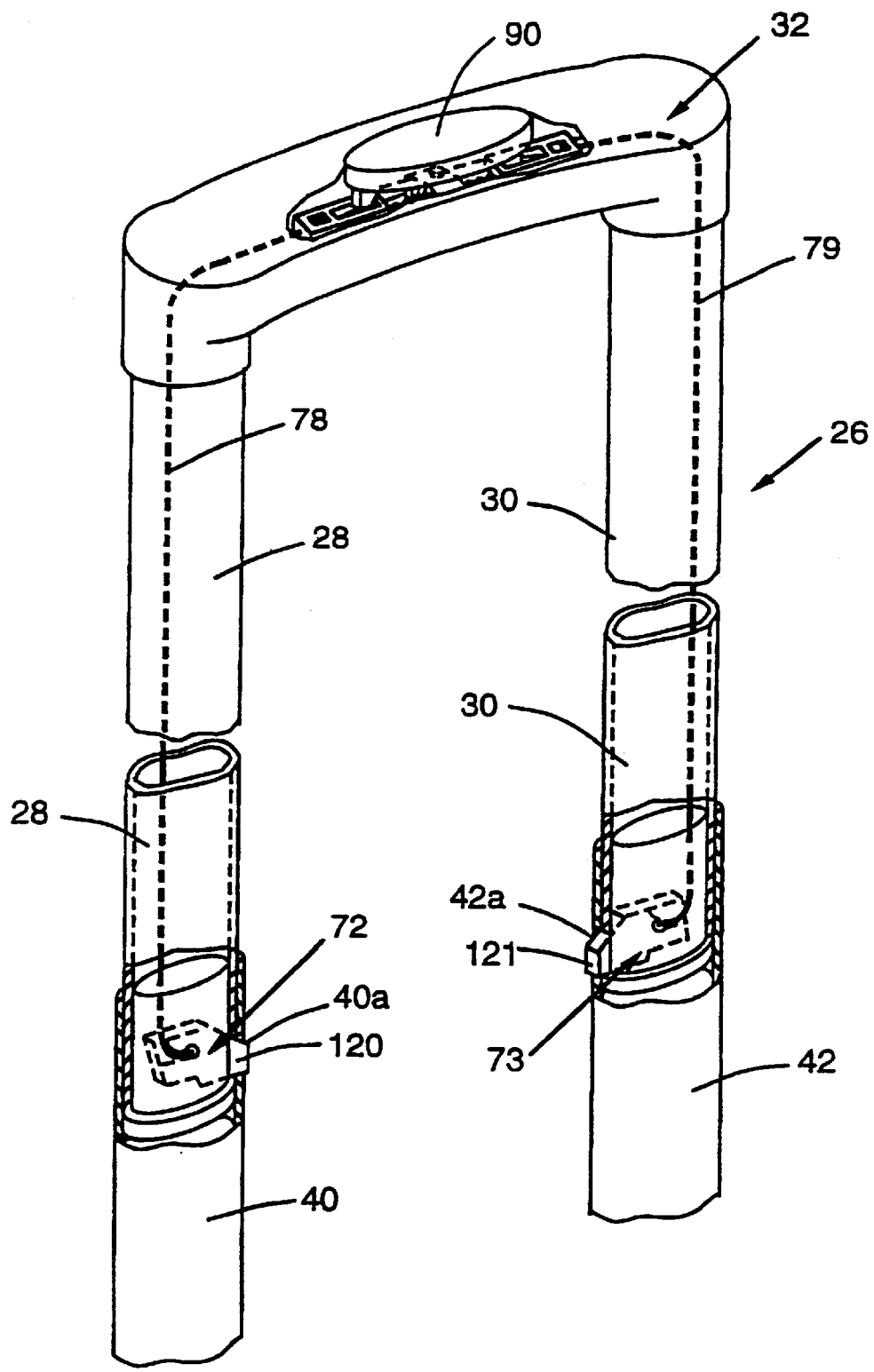
FIG. 6 is a perspective view, partially cutaway, of the handle means in the extended position.
Figure 7:
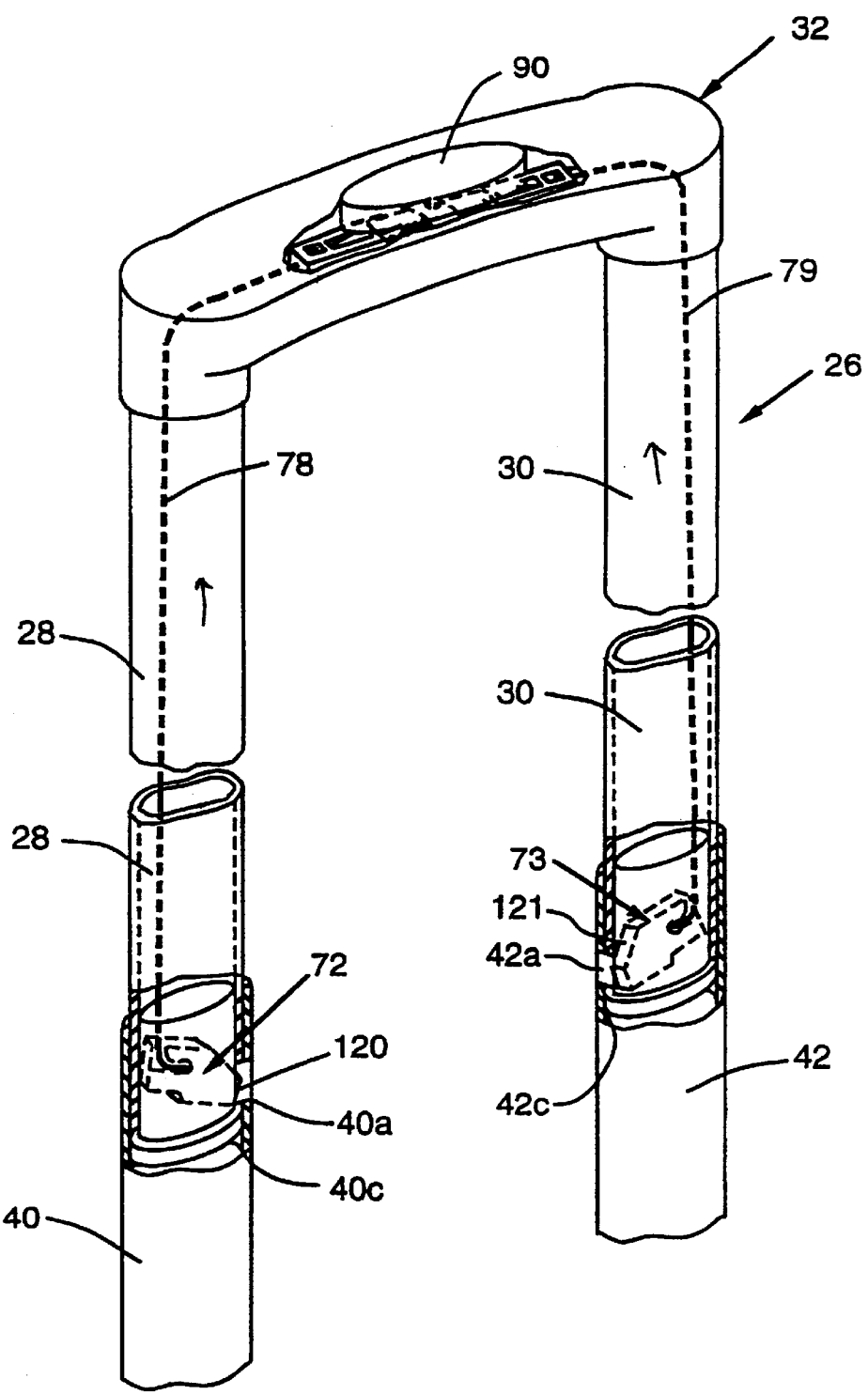
FIG. 7 is a view similar to FIG. 6 only showing when the pushbutton is pushed and the detent is moved.

Referring now to FIGS. 5–7, the handle means 26 will be explained in greater detail. The handle means 26 includes the male tubing members 28, 30 which are slidingly engaged in the female tubing members 40, 42. The female tubing members 40, 42 include openings 40a, 42a and longitudinal slots 40b, 42b. The purpose of the longitudinal slots 40b, 42b will be explained below. The free end of each of the male tubing members 28 and 30 encloses the detent housing 70, 71 which contains the detent 72, 73 of the invention. The detent 72, 73 includes a channel 74, 75 and a rounded opening 76, 77. Cable 78, 79 has one end 78a, 79a connected to the detent 72, 73 as shown in FIG. 5. The other end 78b, 79b of the cable 78, 79 is connected to a tab 80, 81 movably mounted to a lower portion 84 of the gripping portion 32. The tab 80, 81 has an engagement opening 80a, 81a including a sloped pilot surface 80b, 81b. A pushbutton 90 is provided that is movably mounted into an opening 92 in upper portion 93 of the gripping portion 32. The pushbutton 90 has a first projection 94 with a sloped pilot surface 94a and a second projection 95 with a sloped pilot surface 95a. The pushbutton 90 is biased upwardly by means of spring 96. Each of the tabs 80, 81 includes a toothed projection portion 98, 99 that is meshingly engaged with a round gear 100 rotatably mounted to the lower portion 84 of the gripping portion 32.

The detent 72, 73 has the general shape shown in FIG. 5 and includes a top flat section 102, 103; a sloped section 104, 105; a vertical section 106, 107; a bottom flat section 108, 109; a lockdown device engagement section 110, 111; an intermediate horizontal section 112, 113 and an outside vertical section 114, 115. A portion 120, 121 of the detent 72, 73 extends beyond the outer surface 122, 123 of the male tubing members 28, 30.

Also provided in the female tubing members 40, 42 are lockdown devices 130, 131. These lockdown devices 130, 131 include projections 132, 133 having a detent mechanism engagement portion 134, 135 including a sloped pilot surface 136, 137 which act as detent engaging portions. The lockdown device 130, 131 includes a spring 138, 139. The projection 132, 133 also includes a slider mechanism engagement portion 132a, 133a. The operation of the lockdown device 130, 131 will be discussed below in further detail with respect to FIGS. 12–15.

Figure 8:
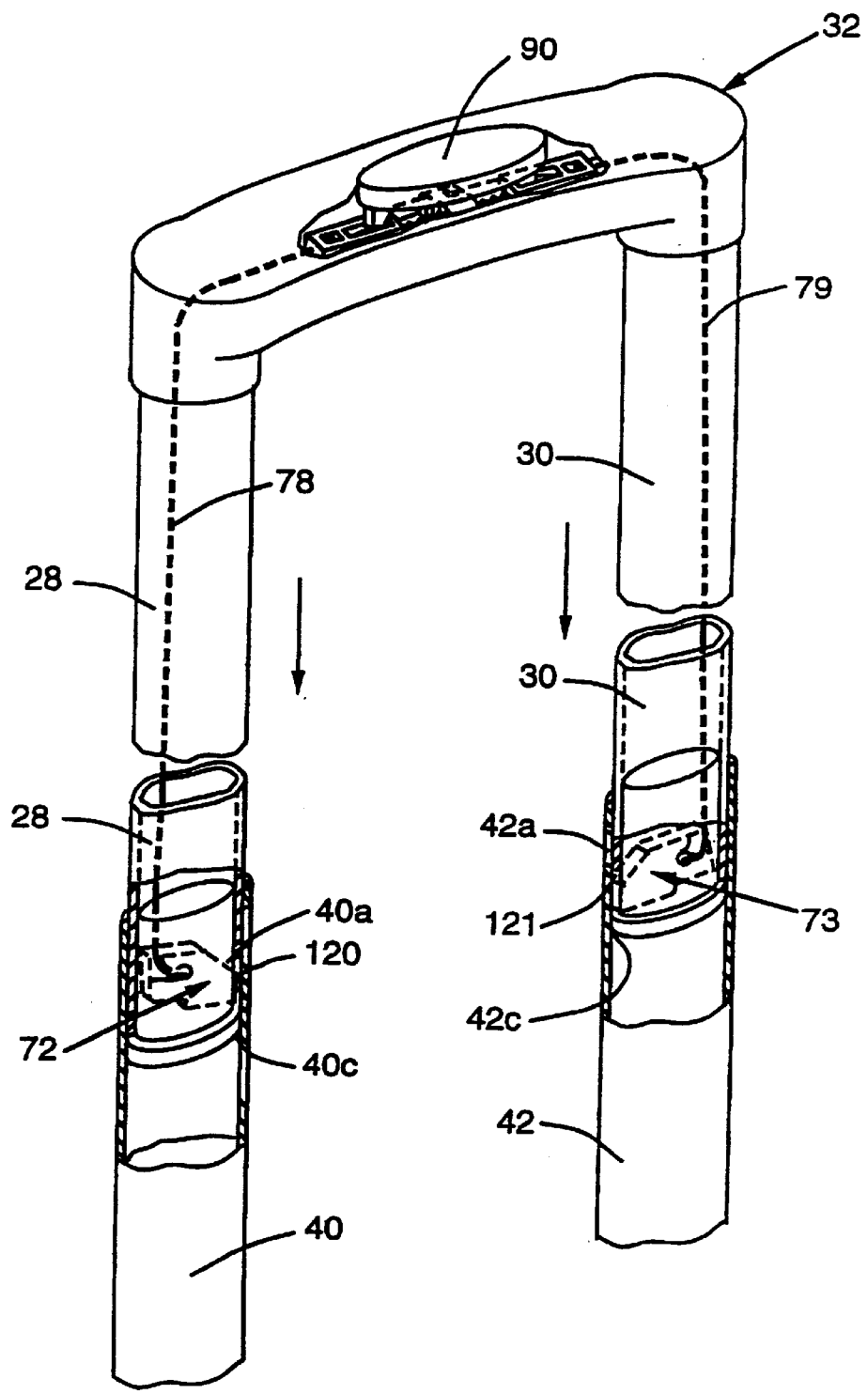
FIG. 8 is a view similar to FIG. 7 only showing the handle being pushed down towards the retracted position.

Referring now particularly to FIGS. 6–8, the operation of the detent 72, 73 vis-a-vis the handle 26 will be explained. In FIG. 6, the handle 26 is shown in its extended position (see FIGS. 2 and 3). In this position, the extension portion. 120, 121 of the detent 72, 73 extends into the openings 40a, 42a in the female tubing 40, 42. In this position, it will be appreciated that the male tubing 28, 30 is locked into the female tubing 40, 42. If it is desired to move the handle 26 to a retracted position (FIG. 1), the pushbutton 90 is depressed, thus rotating the detent 72, 73 out of the openings 40a, 42 as can be seen in FIG. 7.

It will be appreciated that when the pushbutton 90 is depressed, the pilot surface 94a, 95a of the first and second projections 94 and 95 engage against the sloped pilot surfaces 80b, 81b of the tabs 80, 81 thus causing the tabs 80, 81 to move towards each other by means of toothed projection portions 98, 99 meshingly engaging with the round gear 100 (see FIG. 5). This will pull the cables 78, 79 (moving the cables in the direction of the arrow shown in FIG. 7) and thus pivot the detent 72, 73 out of the opening 40a, 42a as shown in FIG. 7. This will allow the male tubing 28, 30 to be pushed downwardly into the female tubing 40, 42. Once the detent 72, 73 clears the opening 40a, 42a, the pushbutton 90 can be released, and the detent 72, 73 will contact the inner surface 40c, 42c of the female tubing 40, 42 as shown in FIG. 8. Due to the design and configuration of the detent 72, 73, the male tubing 28, 30 can slide downwardly in the female tubing 40, 42.

FIGS. 8A and 8B show an alternate embodiment of the pushbutton mechanism. In this embodiment, a pair of camming means 140, 141 are provided to which the cables 78' and 79' are attached. The pushbutton 142 includes two projections 144, 145 which engage against the camming means 140, 141 when pushed down, causing the camming means 140, 141 to rotate about pivot point 146, 147. This in turn will draw the cable 78', 79' inward and thus rotate the detent, as in the embodiment shown in FIGS. 5–8. The pushbutton 142 is biased in the non-engaged position by spring 148.

The above detent design is a unique invention in and of itself and can be used with any retractable handle for a luggage article, whether having a wheeled panel mechanism or not. In fact, the detent design can be used for any item having an extendable handle, such as a dolly or a baby carriage. However, the detent design is especially advantageous when used in connection with the unique wheeled panel mechanism 50 of the invention, as will be explained in further detail below.

Figure 9:
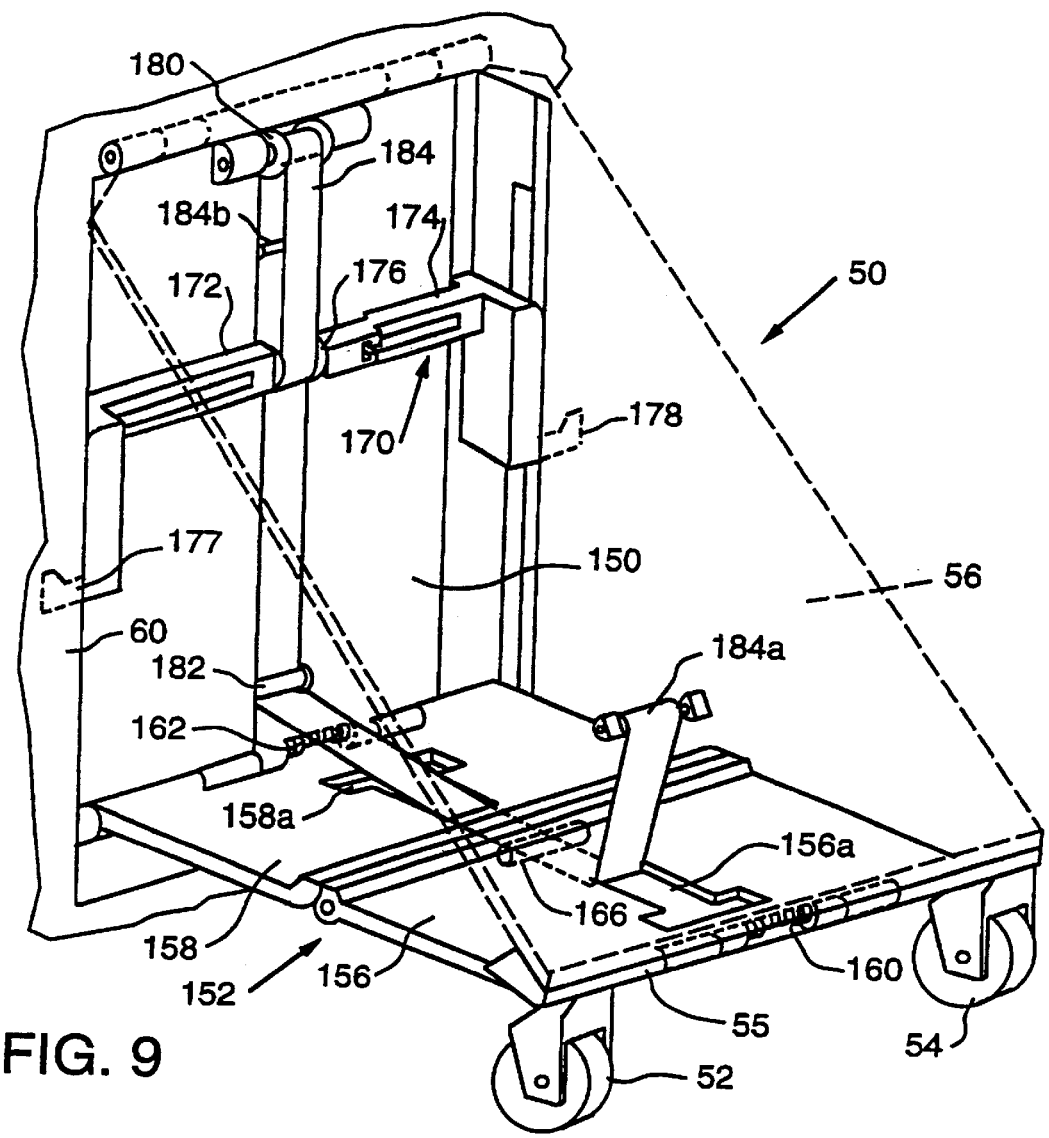
FIG. 9 is a perspective view of the wheeled panel mechanism by itself in its deployed state.

The wheeled panel mechanism 50 of the invention is shown apart from the luggage article in FIG. 9. As was explained above, the mechanism 50 is a modular component which can be attached separately to an existing luggage article or to any other carrying article such as a dolly, cart or baby carriage. The mechanism 50 is connected to a framing member 60 that is itself attached to the female tubing members 40, 42 as was seen in FIG. 4.

Referring now to FIG. 9, the wheeled panel mechanism 50 includes a body portion 150, a pivotably mounted panel 56 (shown in phantom for the sake of clarity) including casters 52, 54 mounted to caster bar 55 and linkage means 152 connecting the body portion 150 to the pivotably mounted panel 56. The linkage means 152 consists of a first link 156 and a second link 158. The first link 156 is pivotably mounted to the panel 56 and the second link 158 whereas the second link 158 is pivotably mounted to the body portion 150 and the first link 156. A first spring 160 is disposed at the joining point of the panel 56 and the first link 156 and a second spring 162 is disposed at the joining point of the body portion 150 and the second link 158. The springs will aid in the deployment of the panel 56 as will be explained below. In addition, a roller 166 is provided at the joining point of first link 156 and second link 158.

The wheeled panel mechanism 50 further includes a slider mechanism 170. The slider mechanism 170 includes a pair of arms 172, 174 that extend away from a central roller 176. The ends of the arms 172, 174 include extension portions 177 and 178, respectively which extended through the slots 40b and 42b in female tubing members 40 and 42 (not shown in FIG. 9).

The body portion 150 includes a pair of spaced apart rollers 180 and 182, with central roller 166 being disposed intermediate thereof. A belt 184 has one end 184a attached to the pivotably mounted panel 56 and a second end 184b attached to the body portion 150. Taking it from end 184a, the belt 184 is threaded through an opening 156a in first link 156, over roller 166 and threaded back through an opening 158a in second link 158. From there, the belt 184 is threaded under roller 182, under central roller 176, over roller 180 and then over central roller 176 of the slider mechanism 170. The belt end 184b is then attached to the body portion.

Figure 10:
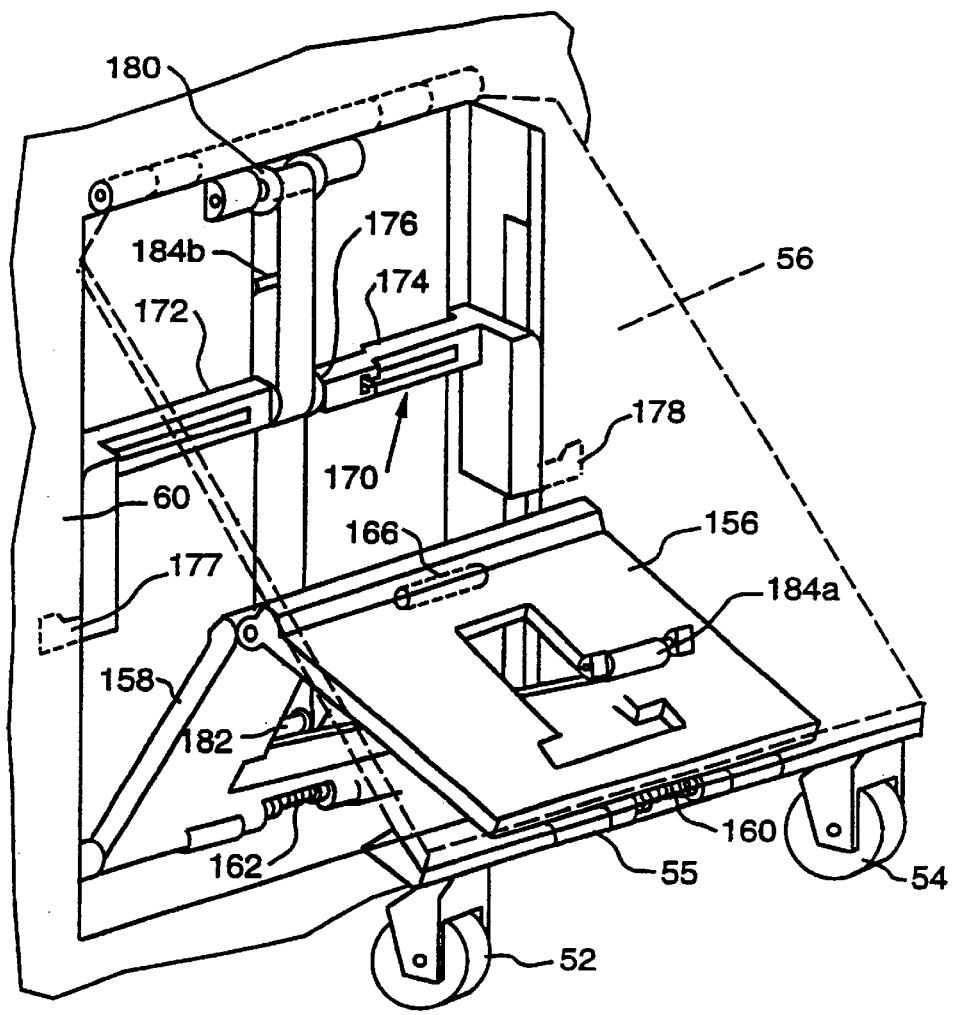
FIG. 10 is a view similar to FIG. 9 only showing the wheeled panel mechanism being partially closed.
Figure 11:
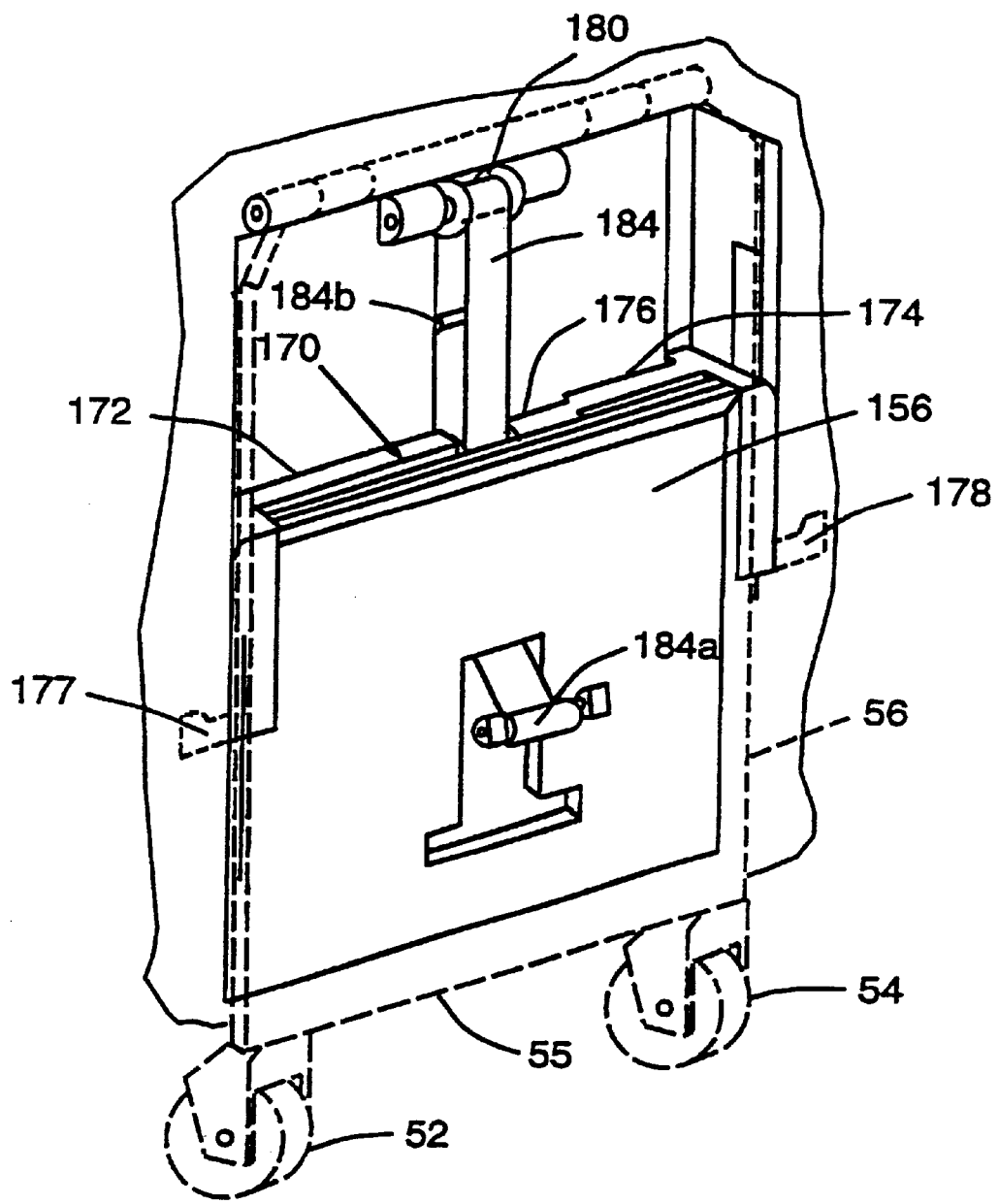
FIG. 11 is a view similar to FIGS. 9 and 10 only showing the wheeled panel mechanism being fully closed.

FIGS. 10 and 11 show how the movement of the slider mechanism pivots the panel 56 so that the wheeled mechanism 50 can be placed in a nondeployed state. As can be seen in FIG. 10, once the slider mechanism 170 is moved downwardly by the detent housing 70, 71 pushing down on the extensions 177, 178 which extend into the female tubing 40, 42 (as will be explained in detail with respect to FIGS. 12–15), the belt 184 is pulled by central roller thus pulling the belt 184 and drawing the first link 156 inward, causing the first link 156 and second link 158 to fold up on each other. Continuing to move the slider mechanism 170 downward will fold up flat the first and second links 156 and 158 so that they will be disposed in the body portion 150 with panel 56 overlying them, as shown in FIG. 11.

Now that the handle 26 and the wheeled panel mechanism 50 have been explained, the cooperation therebetween in order to achieve one of the objects of the invention will now be explained with reference to the cross-sectional views shown in FIGS. 12–15 below. In these cross-sectional views the belt 184 and other parts are not shown in order to increase the clarity of the drawings.

Figure 12:
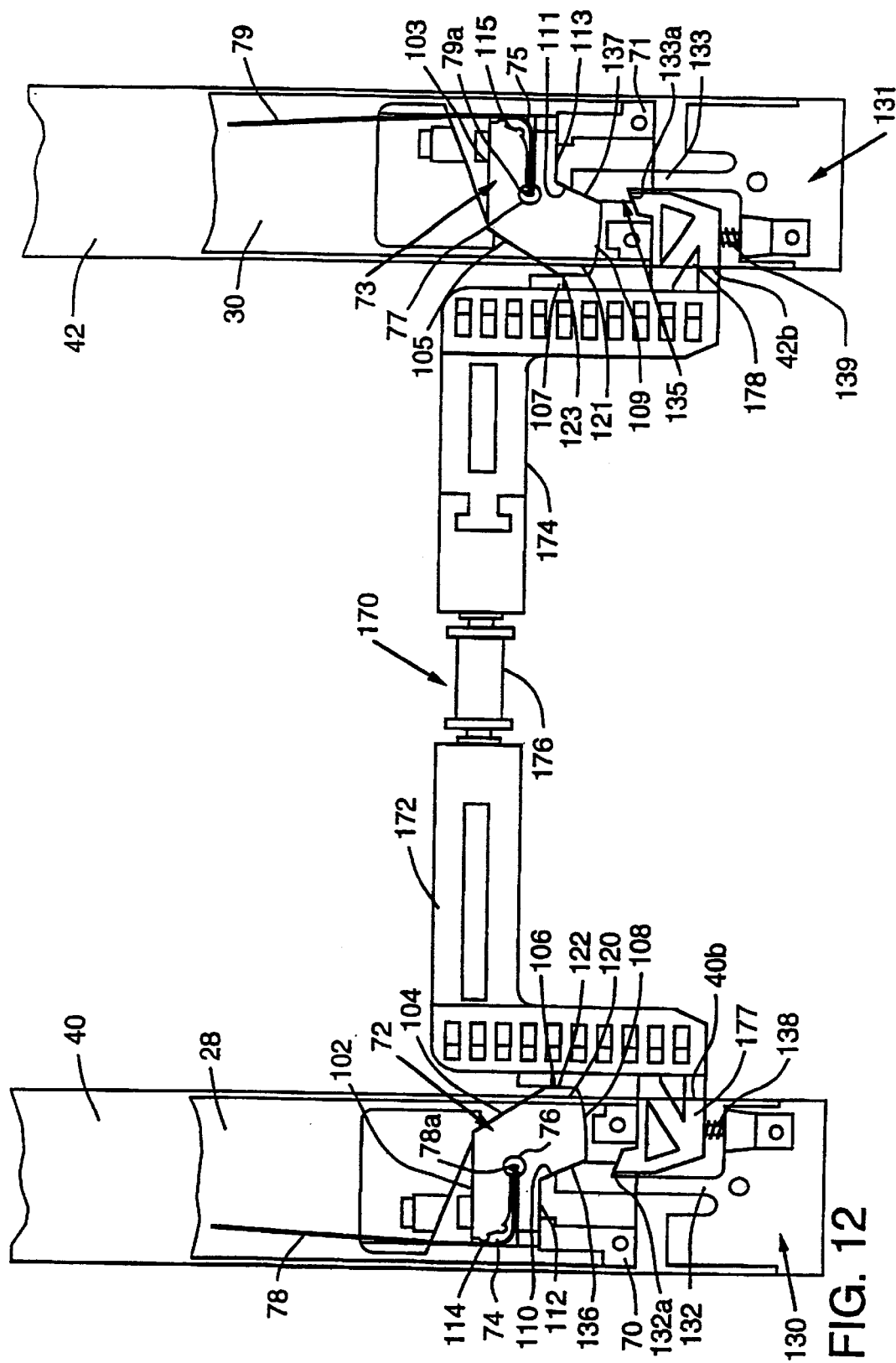
FIG. 12 is a cross-sectional view taken along line 12—12 of FIG. 1.

FIG. 12 is a cross-sectional view taken along line 12—12 of FIG. 1, which shows the handle 26 in its retracted position and the wheeled panel mechanism 50 in its nondeployed position. As can be seen in FIG. 12, the extension 177, 178 of the arm 172, 174 of the slider mechanism 170 extends into the hollow female tubing member 40, 42 through slots 40b and 42b and also engages against, and is locked down to the lockdown device 130, 131 by means of the extension 177, 178 engaging against the slider mechanism engagement portion 132a, 133a of the projection 132, 133. The slider mechanism 170 is biased against springs 138, 139 of the lockdown device 130, 131.

Figure 13:
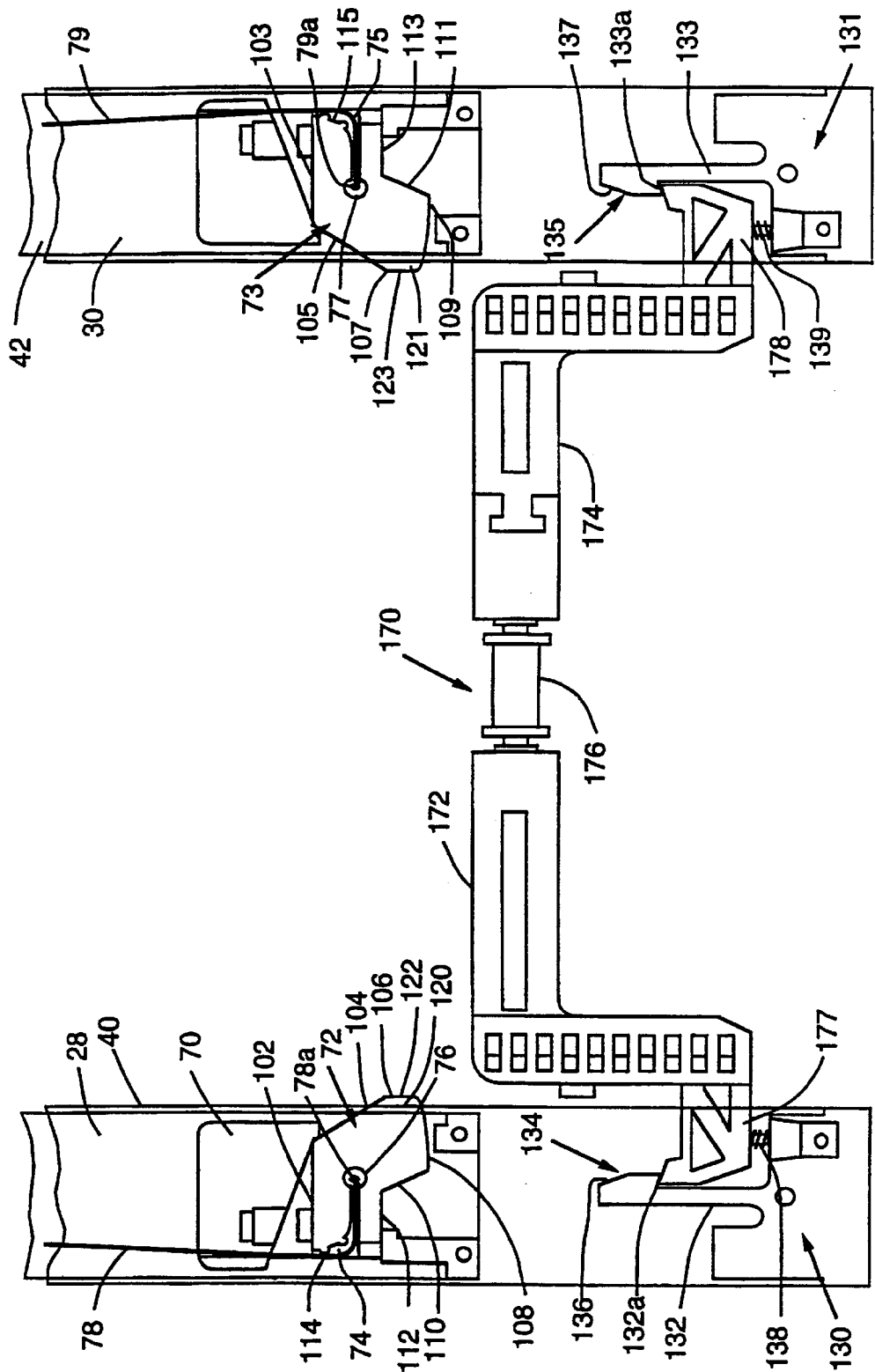
FIG. 13 is a cross-sectional view taken along line 13—13 of FIG. 2.

If it is desired to extend the handle means 26 without deploying the wheeled panel mechanism 50 (FIG. 2) the male tubing 28, 30 is merely slid upwardly in the female tubing 40, 42 as is shown in FIG. 13. It will be appreciated that the slider mechanism 170 remains locked down to the lockdown device 130, 131 thus preventing the deployment of the wheeled panel mechanism 50.

Figure 14:
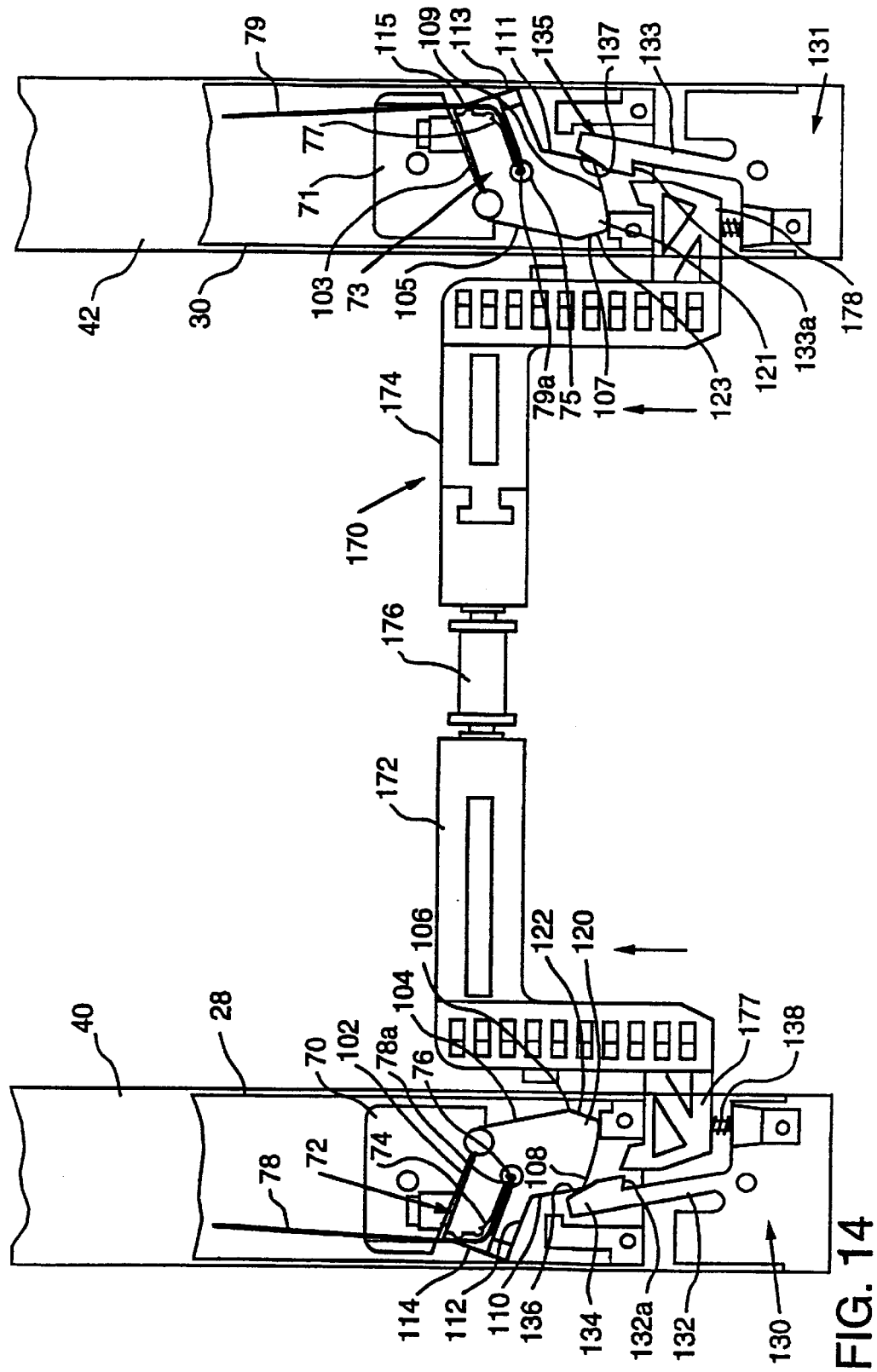
FIG. 14 is a cross-sectional view similar to FIGS. 12 and 13.
Figure 15:
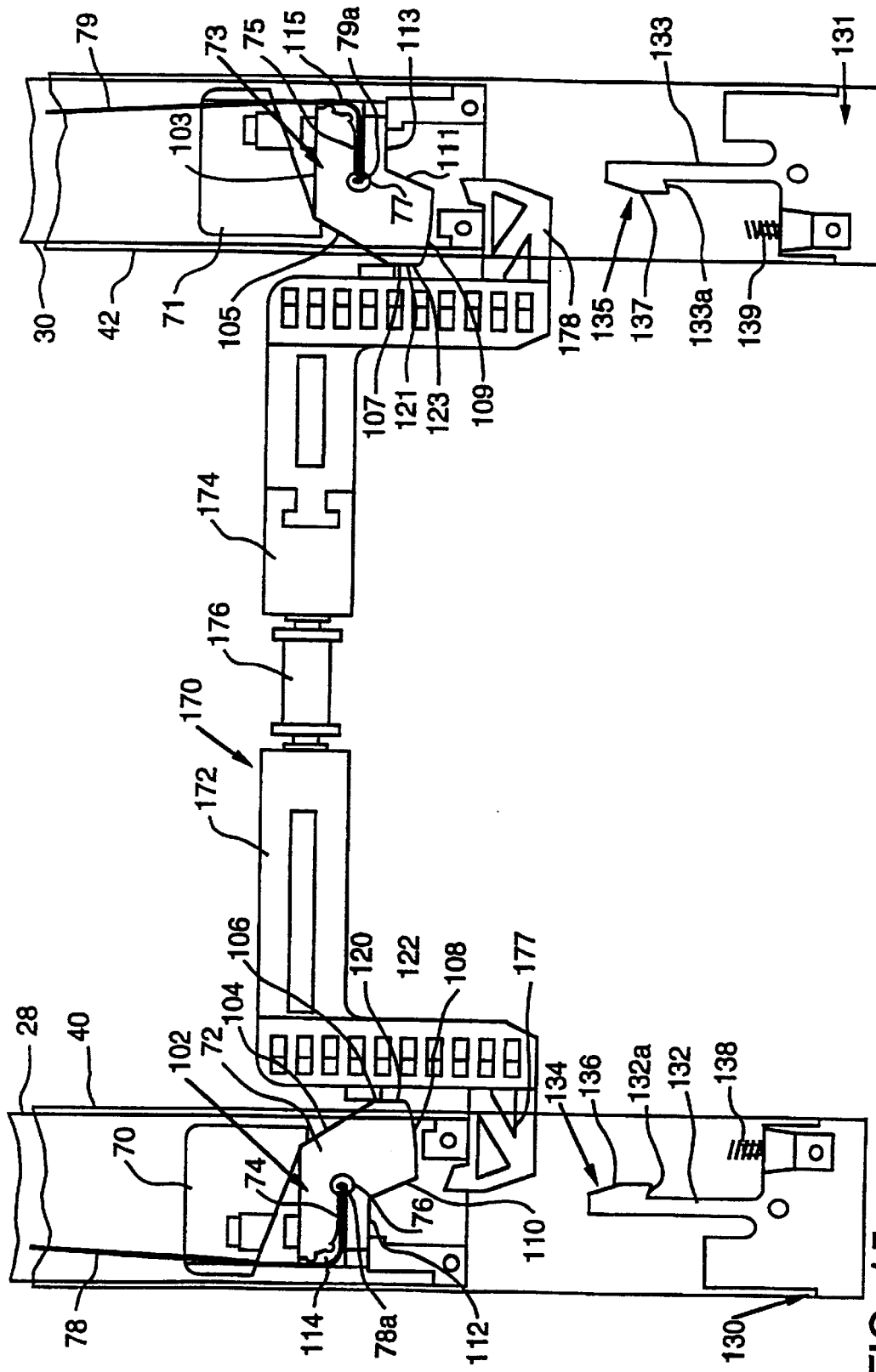
FIG. 15 is a cross-sectional view taken along line 15—15 of FIG. 3.

If it is desired to extend the handle means 26 and deploy the wheeled panel mechanism 50 (FIG. 3), the pushbutton 90 is pushed, and the detent 72, 73 is rotated as is shown in FIG. 14. This action will cause the detent 72, 73 to engage against the sloped pilot surface or detent engaging portions 136, 137 of the projection 132, 133 and rotate the projections 132, 133 away from the extension 177, 178, thus unlocking the slider mechanism 170 from the lockdown device 130, 131 and causing it to move upwardly as shown by arrows on FIG. 14. The combination of the springs 138, 139 along with the springs 160, 162 on the linkage means 152 will cause the wheeled panel mechanism to automatically deploy when the slider mechanism 170 is unlocked from the lockdown devices 130, 131 and thus moves upwardly as is shown in FIG. 15.

When it is desired to retract the handle 26, the male tubing 28, 30 is pushed downwardly which causes the detent housing 70, 71 to engage against the extension 177, 178 of the slider mechanism, thus moving the entire sliding mechanism downwardly until the extension is again locked down onto lockdown device (FIG. 12).

Figure 16:
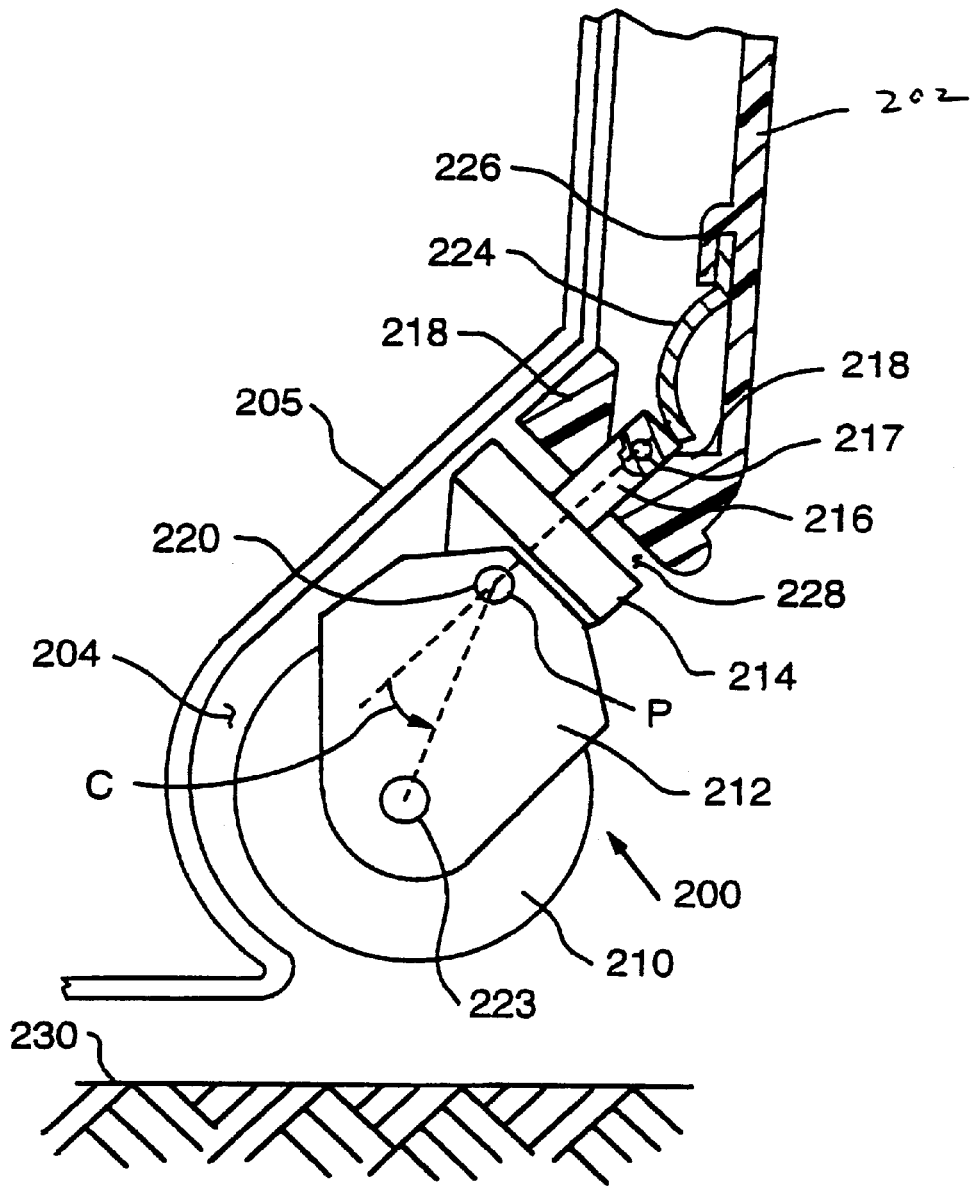
FIG. 16 is a side elevational view, partially in section, showing the caster of the invention in a storage position.
Figure 17:
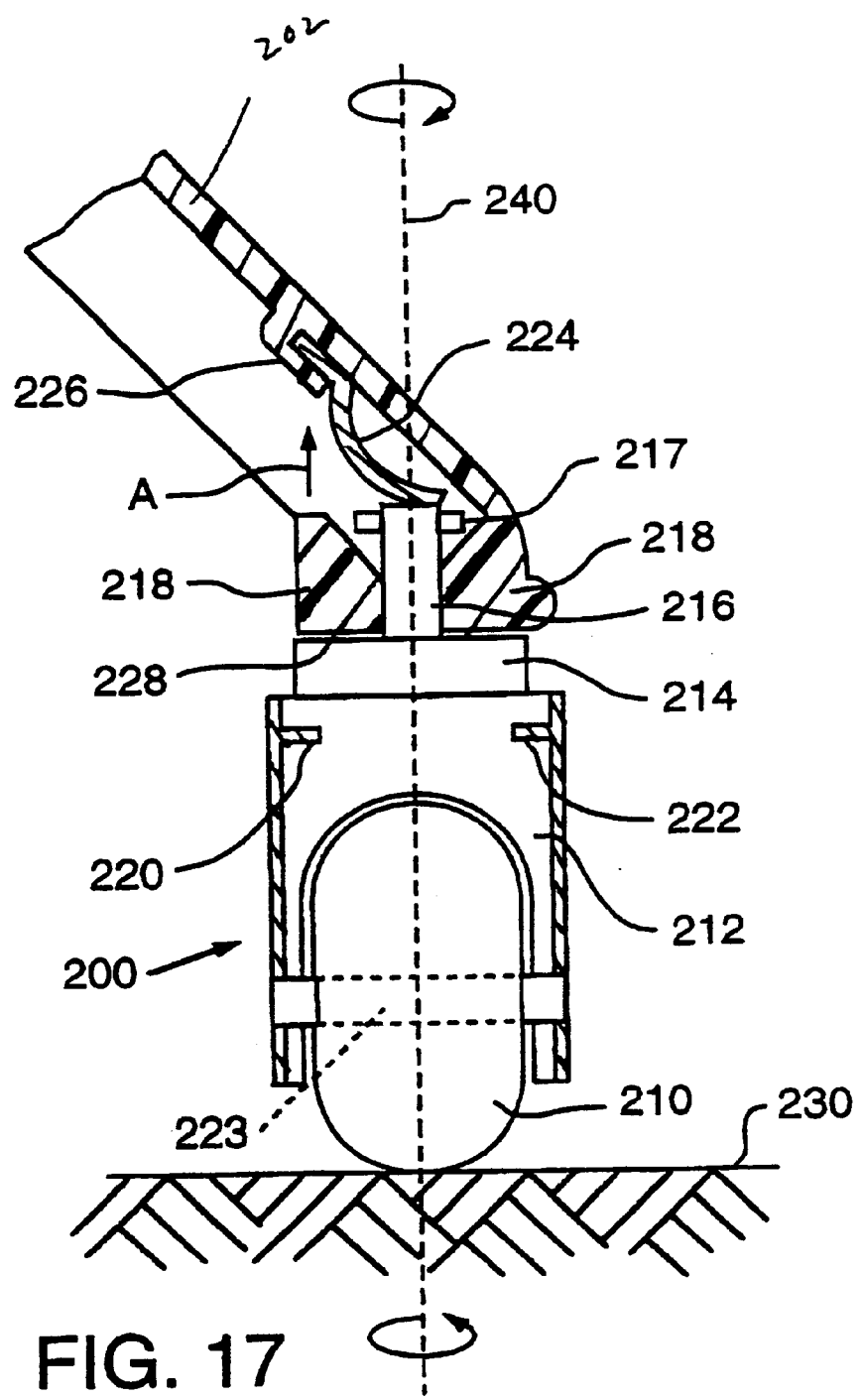
FIG. 17 is a side elevational view, partially in section, of a caster of the invention bearing on a surface.
Figure 18:
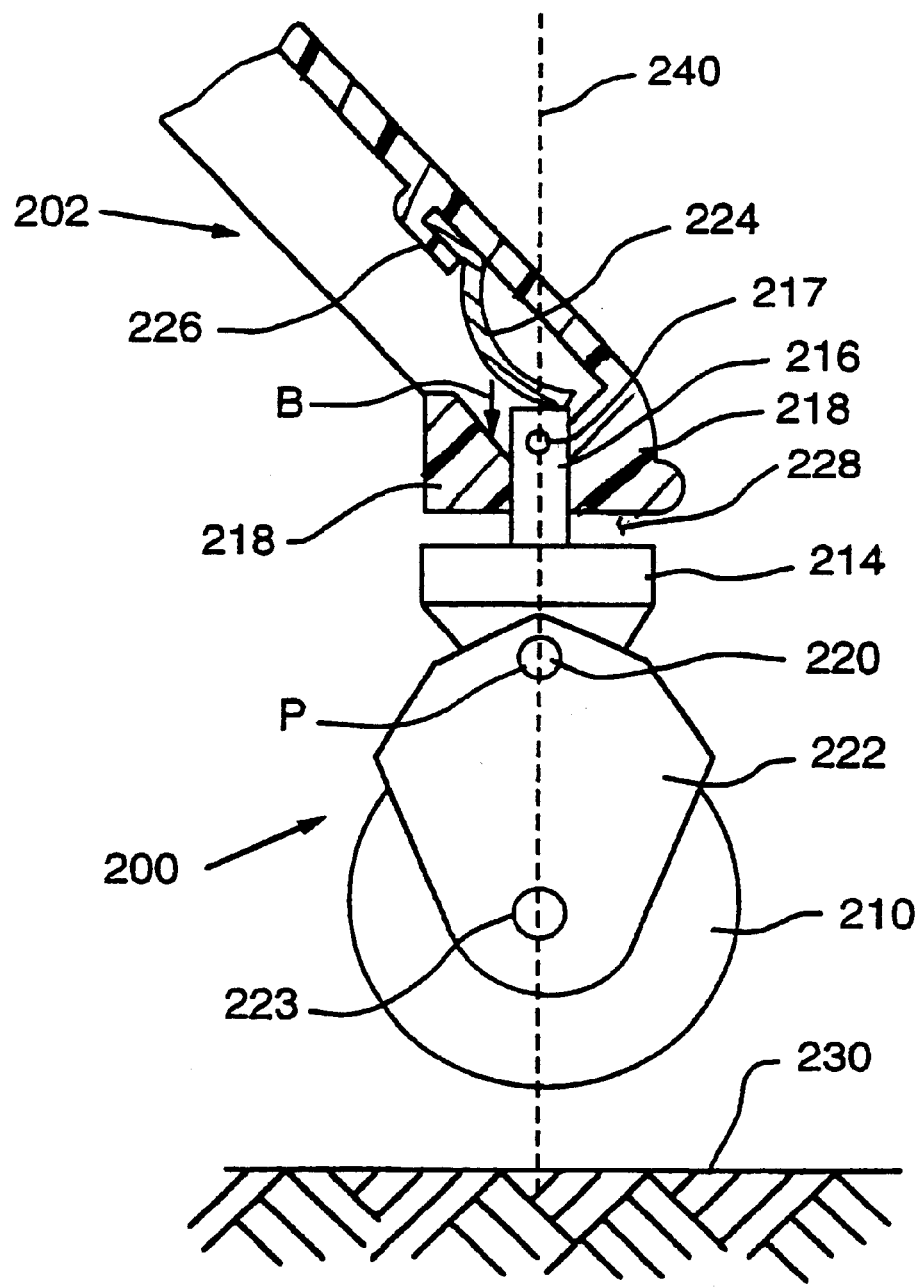
FIG. 18 is a side elevational view, partially in section, of the caster with its wheel lifted off of the ground.

Referring to FIGS. 16–18, the novel and unique caster of the invention will be discussed. Referring particularly to FIG. 16, a caster 200 is shown associated with a retractable portion 202, such as a retractable panel similar to pivotably mounted panel 56 of the wheeled panel mechanism 50 shown in FIG. 3, for example. The retractable portion 202 is shown partially in section in FIGS. 16–18 in order to illustrate the invention. The caster 200 is shown retracted into a cavity 204 of an item 205, such as wheeled panel mechanism 50, for storage purposes. One of the advantages of the design of the caster 200, which will be explained in detail below, is that the caster 200, when retracted and stored, fits better into the cavity 204.

The caster 200 consists of a wheel 210, a wheel frame 212 and a swivel 214. The swivel 214 includes a rod 216 including a cross pin 217 extending therefrom into guiding means 218 formed in the retractable portion 202. The wheel frame 212 connects the swivel 214 to the wheel 210 and is pivotably mounted to the swivel 214 by a pair of connectors 220, 222. Wheel 210 includes an axle 223 having each of its ends axially rotatably mounted to the wheel frame 212, as can be seen in FIG. 17. Retractable portion 202 also includes biasing means, in this embodiment a spring 224, having one end secured to the wall 226 of the retractable portion 202 and having another end bearing against the top surface of rod 216. The spring 224 biases the caster into a storage position wherein the cross pin 217 engages into the V-shaped guiding means 218, and so that a gap 228 is formed between the swivel 214 and the bottom surface 202a of the retractable portion 202.

Referring now to FIG. 17, when the retractable portion 202 is moved from the storage position shown in FIG. 16 and the wheel 210 bears against a surface 230, the entire caster 200 is pushed upwardly against the bias of the spring 224, shown by arrow A. This, in turn, allows the cross pin 217 to move out of the V-shaped guiding means 218. Now, the swivel 214 is able to freely rotate about its vertical axis 240 a full 360°. This is advantageous when the caster 200 bears on surface 230 in that the caster 200 can aid movement of the item on which it is disposed (such as a luggage article) in any desired direction. It will also be appreciated that the cross pin 217 prevents the caster 200 from becoming disengaged from the retractable portion 202.

It will be appreciated that it is desired, once the retractable portion 202 is retracted for storage as shown in FIG. 16, that the caster 200 assume a predetermined position for efficient, space-saving storage. Referring to FIG. 18, once the caster 200 is lifted off of the surface 230, the spring 224 will bias the caster 200 downwardly, as shown by arrow B, thus forcing the rod 216 and cross pin 217 downwardly. This will cause the cross pin 217 to engage against the V-shaped guiding means 218, which will force the cross pin 217 and thus the entire caster 200 to rotate on its vertical axis 240 to the predetermined position as dictated by the construction and arrangement of the guiding means 218 and which is desired based on the design of the item and/or retractable portion to which the caster is mounted. Of course, if the caster is already in its predetermined position when the wheel 210 is lifted off of the ground, there will be no rotation of the caster 200. In this way, whenever the wheel 210 is lifted off of the ground, the caster 200 will assume a predetermined position having a particular desired orientation for efficient storage of the caster 200.

It will be appreciated that although the caster 200 is shown on a retractable portion 202, the invention is not so limited and the caster design disclosed can be used on any item, having a retractable portion or not, where it is desired to use a caster having free range of motion while its wheel is on a surface, but which is desired to assume a predetermined position having a particular desired orientation when its wheel is lifted off of the surface.

Referring back to FIG. 16, it will be seen that the wheel frame 212 of the caster 200 is designed to pivot about a pivot point P in order to further efficiently store the caster 200 into the cavity 204, as shown by arrow C.

While specific embodiments of the invention have been disclosed, it will be appreciated by those skilled in the art that various modifications and alterations to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A luggage article comprising:
    a storage compartment;
    a first rolling means projecting from said storage compartment;
    a wheeled panel mechanism including a pivotably mounted panel, said panel having second rolling means;
    a handle operatively associated with said wheeled panel mechanism, said handle being movable between a retracted position and an extended position; and
    means for selective deployment or nondeployment of said second rolling means at a time when said handle is moved from said retracted position to said extended position.

2. The luggage article of claim 1, wherein
said wheeled panel mechanism includes a body portion and linkage means connecting said body portion to said pivotably mounted panel.

3. The luggage article of claim 2, wherein
said means for selective deployment or nondeployment of said second rolling means includes:
    detent means operatively associated with said handle;
    a slider mechanism movable in said body portion, said slider mechanism causing movement of said pivotably mounted panel between a deployed position where said second roller means are deployed and a nondeployed position where said second roller means are not deployed; and
    a lockdown device for locking said slider mechanism so that said pivotably mounted panel remains in said nondeployed position when said handle is moved from said retracted position to said extended position, said detent means being operatively associated with said lockdown device in order to unlock said slider mechanism therefrom so that said slider mechanism can move and cause movement of said pivotably mounted panel from said nondeployed position to said deployed position.

4. The luggage article of claim 3, wherein
said handle includes a pair of spaced apart female tubes secured to a frame of said storage compartment; and
a pair of male tubes, each of which is slidingly engaged in respective female tubes, said male tubes being joined by a gripping portion at one end thereof and having free ends opposite said gripping portion.

5. The luggage article of claim 4, wherein
said detent means includes:
    a detent mechanism disposed in said free end of each of said male tubes, said detent mechanism including a detent housing and a movable detent disposed in said detent housing;
    a button mounted in said gripping portion; and
    first and second cables connecting said button to said respective movable detents such that movement of said button causes corresponding movement of both of said movable detents.

6. The luggage article of claim 5, wherein
said female tubes each include a longitudinal slot, said slider mechanism having opposed portions which engage into each said respective longitudinal slot, said detent housing engaging respective said opposed portions of said slider mechanism, whereby movement of said male tubes in said female tubes can cause corresponding movement of said slider mechanism in said body portion.

7. The luggage article of claim 6, wherein
each of said female tubes includes a separate lockdown device mounted therein, each said lockdown device including a projection, said projection having a slider mechanism engagement portion and a detent engagement portion, said opposed portions of said slider mechanism engaging against said respective slider mechanism engagement portions when said slider mechanism is locked;

said movable detent engaging against said detent engagement portion and moving said projection in order to unlock said slider mechanism from said lockdown device when said pushbutton is engaged in order to move said detent.

8. The luggage article of claim 7, wherein each said lockdown device includes a spring that biases said respective opposed portions of said slider mechanism against said respective slider mechanism engagement portions; and said linkage means includes at least one spring that biases said pivotably mounted panel into said deployed position, whereby unlocking said slider mechanism will automatically move said pivotably mounted panel into said deployed position.

9. The luggage article of claim 8, including a belt having a first end attached to said body portion and a second end attached to said linkage means, said belt being operatively associated with said slider mechanism so that movement of said slider mechanism causes movement of said linkage means.

10. The luggage article of claim 9, including said slider mechanism includes a first roller;

a second roller mounted to said body portion;

a third roller spaced apart from said second roller and also mounted to said body portion; and said belt engaging against said first, second and third rollers in order to translate movement of said slider mechanism to movement of said pivotably mounted panel in order to move said pivotably mounted panel between said deployed position and said nondeployed position.

11. The luggage article of claim 10, wherein said linkage means includes a first link and a second link, said first link is pivotably mounted to said panel and said second link and said second link is pivotably mounted to said first link and said body portion, whereby when said pivotably mounted panel is in said nondeployed position, said first and second links fold on top of each other and are disposed in a cavity formed by said body portion with said panel being overlaid thereon.

12. The luggage article of claim 5, wherein each of said female tubes includes an opening, said movable detent being constructed to automatically engage into said opening when said handle is moved from said retracted position to said extended position thus locking said handle into said extended position; and said movable detent disengages from said opening thus unlocking said handle in order to move said handle away from said extended position, said movable detent being disengaged when said button is moved.

13. The luggage article of claim 5, wherein said button includes:
  a housing;
  a first tab and a second tab movably mounted in said housing, said first cable being attached to said first tab and said second cable being attached to said second cable; and
  a pushbutton operatively associated with said first tab and said second tab, whereby movement of said pushbutton causes responsive movement of said tabs and thus said cables in order to move said movable detents.

14. The luggage article of claim 13, wherein said tabs each include engagement openings formed therein, said engagement openings including a sloped pilot surface;

said pushbutton includes a first projection having a pilot surface and a second projection having a pilot surface, said pilot surfaces of said projections engaging against said pilot surfaces of said engagement openings taken said pushbutton is pushed in so that said tabs are drawn towards each other in order to move said cables and thus said movable detents.

15. The luggage article of claim 14, including a pushbutton spring biasing said pushbutton in a first position wherein said movable detent projects from said male tube.

16. The luggage article of claim 5, wherein said button is a spring biased pushbutton which engages a camming means when said pushbutton is pushed down, said camming means rotating about a pivot point and causing responsive movement of said cable.

17. The luggage article of claim 1, wherein said second roller means is a caster.

18. The luggage article of claim 17, wherein said caster comprises:
  a caster frame rotatably attached to said wheeled panel mechanism;
  a wheel axially rotatably mounted to said caster frame, said wheel having an axis of rotation generally perpendicular to an axis of rotation of said caster frame; and
  said caster frame being (i) freely rotatable about its axis of rotation when said wheel bears against a surface and (ii) oriented in a predetermined position when said wheel is not bearing against said surface.

19. The luggage article of claim 18, wherein said wheeled panel mechanism includes guiding means, a portion of said caster frame being guided by said guiding means when said wheel is lifted from said surface so as to position said caster frame in said predetermined position.

20. The caster of claim 19, wherein said caster frame includes a rod extending from said wheel through said guiding means, said rod including a pin; and said guiding means being constructed and arranged for guiding said pin to orient said wheel and said wheel frame in said predetermined position.

21. The caster of claim 20, wherein said guiding means has a V-shape cross-section for guiding said pin.

22. The caster of claim 21, wherein said retractable portion includes a biasing means to bias said wheel and said caster frame into said predetermined position when said wheel is not bearing against said surface.

23. The caster of claim 18, wherein said caster frame includes (i) a swivel and (ii) a wheel frame connecting said swivel with said wheel, said wheel frame being pivotably mounted to said swivel so that when said retractable portion is stored, said wheel and said caster frame can be positioned so as to occupy less space than a wheel and caster frame without said pivotably mounted plate.

* * * * *